United States Patent [19]

Itoh et al.

[11] Patent Number: 4,748,553
[45] Date of Patent: May 31, 1988

[54] SEQUENCE CONTROL APPARATUS

[75] Inventors: Atsushi Itoh, Narashino; Mitsusuke Okamura, Togane; Katsuhiro Fujiwara, Funabashi; Toshiro Kasahara, Narashino, all of Japan

[73] Assignee: Hitachi, Ltd., Tokyo, Japan

[21] Appl. No.: 827,605

[22] Filed: Feb. 10, 1986

[30] Foreign Application Priority Data

Mar. 6, 1985 [JP] Japan .................................. 60-42603

[51] Int. Cl.⁴ .............................................. G06F 11/00
[52] U.S. Cl. ...................................... 364/140; 364/184
[58] Field of Search ............... 364/184, 185, 140, 141; 371/25, 26, 57; 340/825.15, 825.16

[56] References Cited

U.S. PATENT DOCUMENTS

| 3,497,685 | 2/1970 | Stafford et al. | 371/26 |
| 4,441,074 | 4/1984 | Bockett-Pugh et al. | 371/25 |
| 4,521,847 | 6/1985 | Ziehm et al. | 364/184 |
| 4,604,746 | 8/1986 | Blum | 371/25 |
| 4,633,384 | 12/1986 | Kusumi | 364/184 |

Primary Examiner—Charles E. Atkinson
Assistant Examiner—Allen MacDonald
Attorney, Agent, or Firm—Antonelli, Terry & Wands

[57] ABSTRACT

The states of the signals inputted to a programmable sequence controller or outputted from the programmable sequence controller are stored by a few scanning operations. A check is made to see if a combination of input and output signals which cannot be generated during one scanning operation in the normal operating mode exists in that memory content or not, thereby investigating causes of the occurrence of abnormalities.

9 Claims, 6 Drawing Sheets

| MEMORY AREA | 3' | Y100' | Ls1' | Ls2' | Y101' | Ls3' | Y102' | Ls4' |
|---|---|---|---|---|---|---|---|---|
| a | H | H | H | L | L | L | L | L |
| b | L | H | H | L | L | L | L | L |
| c | L | H | L | L | L | L | L | L |
| d | L | H | L | H | H | L | L | L |
| e | L | H | L | L | H | L | L | L |
| f | L | L | L | L | L | H | H | L |

FIG. 8

| MEMORY AREA | 3' | Y100' | Ls1' | Ls2' | Y101' | Ls3' | Y102' | Ls4' |
|---|---|---|---|---|---|---|---|---|
| a | H | H | H | L | L | L | L | L |
| b | L | H | H | L | L | L | L | L |
| c | L | H | L | L | L | L | L | L |
| d | L | H | L | H | H | L | L | L |
| e | L | H | L | L | H | L | L | L |
| f | L | L | L | L | L | L | H | H | ized and the memory content is printed on a paper or dis-
SEQUENCE CONTROL APPARATUS

BACKGROUND OF THE INVENTION

1. Field of the Invention

The present invention relates to a sequence control apparatus which can easily investigate causes of abnormality in a sequence control system.

2. Description of the Prior Art

It has been proposed that in the case where abnormality occurs in the sequence control during the operation, the state transitions of input and output are held and the causes of the occurrence of the abnormality are investigated.

According to the method proposed conventionally, the states of the input/output signals of the sequencer are time-sequentially stored when abnormality occurs, and the memory content is printed on a paper or displayed on a screen or the like, and is compared with a check list which has been preliminarily stored and printed on the paper or displayed on the screen in the normal operating mode.

This method is effective for investigation of the causes of abnormalities in the case where it is used for a system to be controlled in which the input/output signals change at accurate time intervals in accordance with an accurate time sequence.

However, in many systems to be controlled, the input/output signals do not change at accurate time intervals.

In such a case, it is difficult to investigate the causes of the abnormality by time-sequentially following the states of the input/output signals. This is because the conditional judgment type sequencer takes in the input/output signals synchronously with the timing signal irrespective of the transition of the input/output signals, so that even if the input/output signals change, this change is stored when the scanning operation is performed instead of being stored at the time of the occurrence of the change.

The failure diagnosis function has been set forth in the Official Gazette of Japanese patent Examined Publication No. 20042/1983.

SUMMARY OF THE INVENTION

The present invention is made in consideration of the above-mentioned points and it is an object of the invention to provide a sequence control apparatus which can relatively easily investigate causes of abnormality even in the case where the input/output signals do not change at accurate time intervals.

Namely, a sequence control apparatus of the invention comprises a program memory circuit, an input circuit, an operation circuit, an output circuit, a sampling signal generator, a signal state memory circuit, a setting circuit, and a detecting circuit.

The program memory circuit stores a sequence program.

The input circuit inputs external information necessary for the sequence control.

The operation circuit executes the logic operations of a plurality of signals including the external information taken from the input circuit in accordance with an instruction of the sequence program read out from the program memory circuit.

The output circuit converts the control signal corresponding to the result of the operation by the operation circuit into the voltage level which is required by the equipment to be controlled and then outputs this voltage level.

The sampling signal generator generates a sampling signal at regular time intervals, or at predetermined irregular time intervals, or each time a certain condition is satisfied.

The signal state memory circuit stores the states of a plurality of binary signals (for example, all of the input and output signals of the operation circuit or the major signals among those input and output signals which are particularly effective for investigation of the causes of the failure) handled by the operation circuit by an amount as many as a plurality of sampling signals in synchronism with the sampling signal which is generated from the sampling signal generator.

The setting circuit sets a special combination of a plurality of binary signals which are stored by the signal state memory circuit.

The detecting circuit detects whether or not the combination of the signal states set by the setting circuit has been stored in the signal state memory circuit.

BRIEF DESCRIPTION OF THE DRAWINGS

FIG. 6 is a diagram showing the memory state of a signal state memory circuit when the system to be controlled shown in FIG. 2 normally operates;

FIG. 8 is a diagram showing the memory state of the signal state memory circuit when the system to be controlled shown in FIG. 2 abnormally operates.

DESCRIPTION OF THE PREFERRED EMBODIMENT

Figure 2:
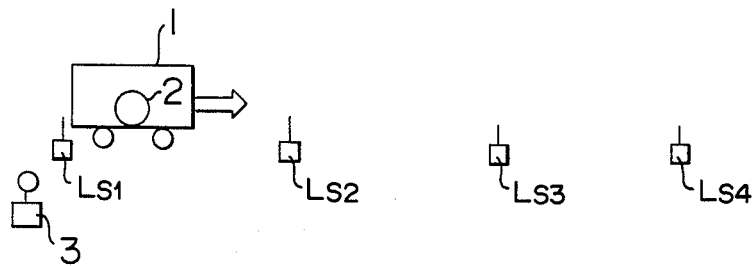
FIG. 2 is a schematic diagram of a system to be controlled which is shown as an example for easy understanding of the apparatus of the invention.
Figure 3:
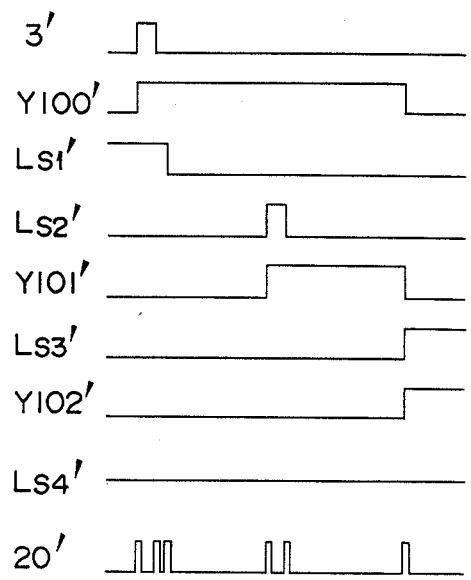
FIG. 3 is a time chart of input/output signals in the normal operating mode of the system to be controlled shown in FIG. 2.

A detailed description will be first made with reference to FIGS. 2 and 3. A motor 2 to drive a handcar 1 is mounted on the handcar 1. A current is supplied to the motor 2 through a trolley and a pantagraph (not shown) provided along the rails. The motor 2 is started by pressing a push button 3 and the handcar 1 starts running toward a destination. $L_{s1}$ to $L_{s4}$ denote limit switches provided along the rails of the handcar 1, in which $L_{s1}$ is at the origin position, $L_{s2}$ is attached at a deceleration start position; $L_{s3}$ is at the stop position, and $L_{s4}$ is at an emergency stop position, respectively. These switches are operated in dependence on the handcar 1.

In FIG. 3, reference numeral 31 and characters $L_{s1}'$, $L_{s2}'$, $L_{s3}'$, and $L_{s4}'$ denote the operating states of the push button 3 and limit switches $L_{s1}$ to $L_{s4}$, respectively. This time chart shows that the input signal 3' was turned on at the leading time and the output signals $L_{s1}'$ to $L_{s4}'$ were turned off at the trailing time.

The signals of the push button 3 and limit switches $L_{s1}$ to $L_{s4}$ are inputted to an input circuit 10 (refer to FIG. 1) of a sequence control apparatus, respectively.

In FIG. 3, reference numerals $Y100'$, $Y101'$, and $Y102'$ denote a signal to drive the motor 2, a signal to drive the motor 2 at a low speed, and a signal to brake the motor 2, respectively. These signals are outputted from an output circuit 12 (refer to FIG. 1) of the sequence control apparatus, respectively.

As will be obvious from this time chart, pressing the push button 3 allows the signal $Y100'$ to be promptly turned on and the motor 2 starts, so that the handcar 1 starts running toward the destination. Thus, the limit switch $L_{s1}$ is turned off and the limit switch $L_{s2}$ is then turned on. At this time the signal $Y101'$ is turned on and the pole of the motor 2 is changed so that the handcar 1 runs at a low speed.

When the handcar 1 comes into contact with the limit switch $L_{s3}$, the signal $Y102'$ is turned on and the current supply to the motor 2 is stopped, so that the handcar 1 is braked. Therefore, when the limit switch $L_{s3}$ is turned off by the handcar 1, the handcar 1 stops in a short time.

Figure 1:
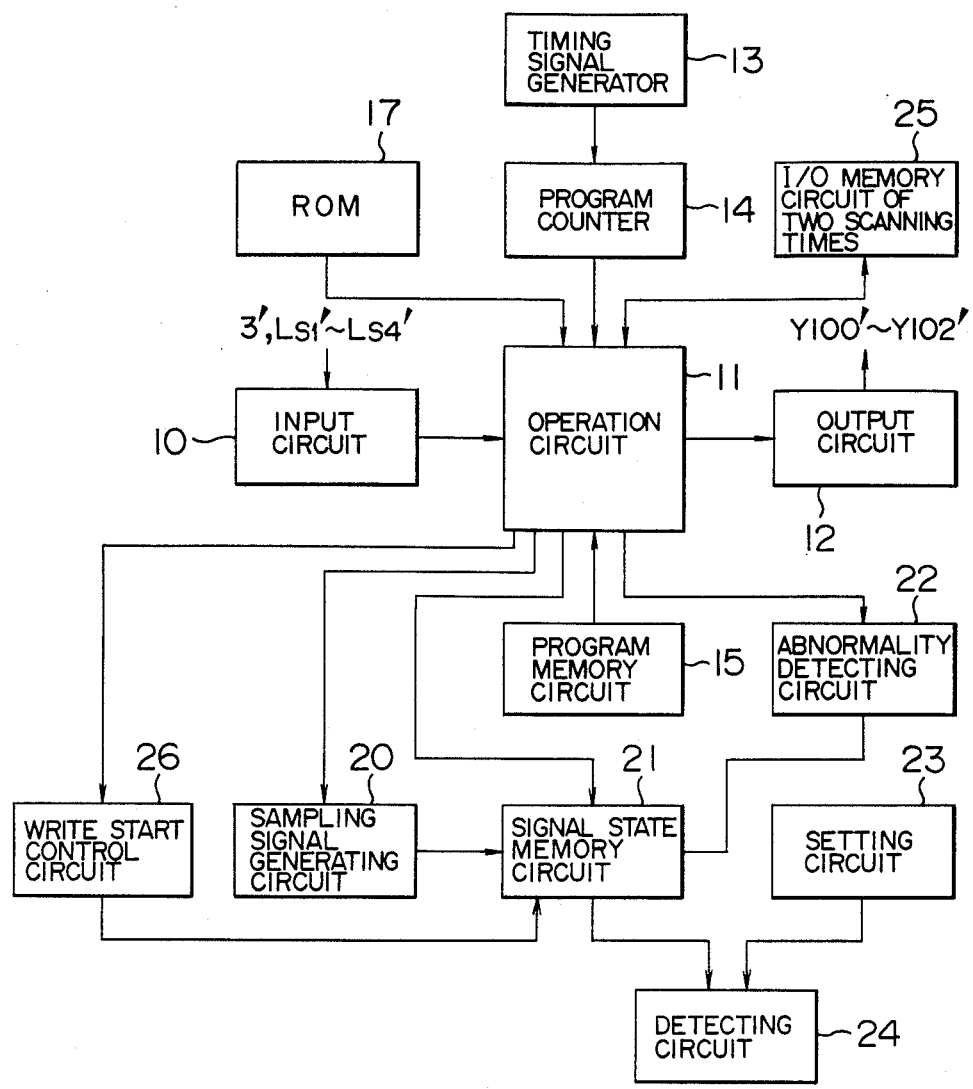
FIG. 1 is a block diagram showing an embodiment of a sequence control apparatus of the present invention.

An explanation will then be made with respect to FIG. 1. Reference numeral 10 denotes the input circuit; 11 is an operation circuit; 12 the output circuit; 13 a timing signal generator; 14 a program counter; 15 a program memory circuit; and 17 a ROM.

The input circuit 10 receives the signals indicative of the operating states of the push button 3 and limit switches $L_{s1}$ to $L_{s4}$. The operation circuit 11 is also called a central processing unit and reads out the sequence program stored in the program memory circuit 15 and executes the logic operations of a plurality of signals including external information which are inputted from the input circuit 10 and output circuit 12 in accordance with an instruction of the sequence program. The operation circuit 11 also receives one external information and inverts, integrates, differentiates, or delays this signal. The kind of operation is instructed on the basis of the sequence program stored in the program memory circuit 15.

The operation circuit 11 outputs the result of the operation to the output circuit 12. The output circuit 12 has therein flip-flops (not shown) as many as the number of outputs and holds the previous signal state until the relevant signal which is outputted from the operation circuit 11 is inverted. As mentioned above, the signals $Y100'$ to $Y102'$ are outputted from the output circuit 12.

The timing signal generator 13 generates a timing signal at regular time intervals.

The program counter 14 receives the timing signal from the generator 13 and instructs the step of the sequence program which is read out by the operation circuit 11 from the program memory circuit 15.

The ROM 17 stores appropriate software to make the overall system operative as a sequencer.

Reference numeral 20 denotes a sampling signal generator; 21 is a signal state memory circuit; 22 an abnormality detecting circuit; 23 a setting circuit; and 24 a detecting circuit.

The sampling signal generator 20 generates a sampling signal in response to the reception of the next signal from the operation circuit 11. Namely, this next signal denotes that either one of the input signals $3'$ and $L_{s1}'$ to $L_{s4}'$ input circuit 10 and the output signals $Y100'$ to $Y102'$ of the output circuit 12 is inverted at the present scanning time as compared with the corresponding signal at the previous time of the scanning. To allow the operation circuit 11 to have such a function, it will be convenient to provide an input/output memory circuit of two scanning times as indicated at 25. The memory circuit 25 is constituted in a manner such as to sequentially update the input and output signals as many as two latest scanning times and store them. The operation circuit 11 compares those input and output signals as many as two scanning times and outputs a signal to the sampling signal generator 20 when at least either one of those signals has been inverted.

It is obviously possible to allow the input circuit 10 and output circuit 12 to directly output a signal to make the sampling signal generator 20 generate the sampling signal. In this case, there is no need to provide the input-/output memory circuit 25 of two scanning times.

Further, the generator 20 can also generate the sampling signal for every constant time interval. However, as compared with this case, as mentioned above, by constituting such that the sampling signal generator 20 generates the sampling signal when either one of a plurality of signals handled by the operation circuit 11 changed, in many cases, there is an advantage such that the memory capacity of the signal state memory circuit 21 can be reduced. Therefore, an explanation will be made hereinbelow with respect to the case where the sampling signal generator 20 generates the sampling signal when either one of a plurality of signals handled by the operation circuit 11 changes.

In this case, the sampling signal is outputted as indicated at $20'$ in FIG. 3.

Figure 4:
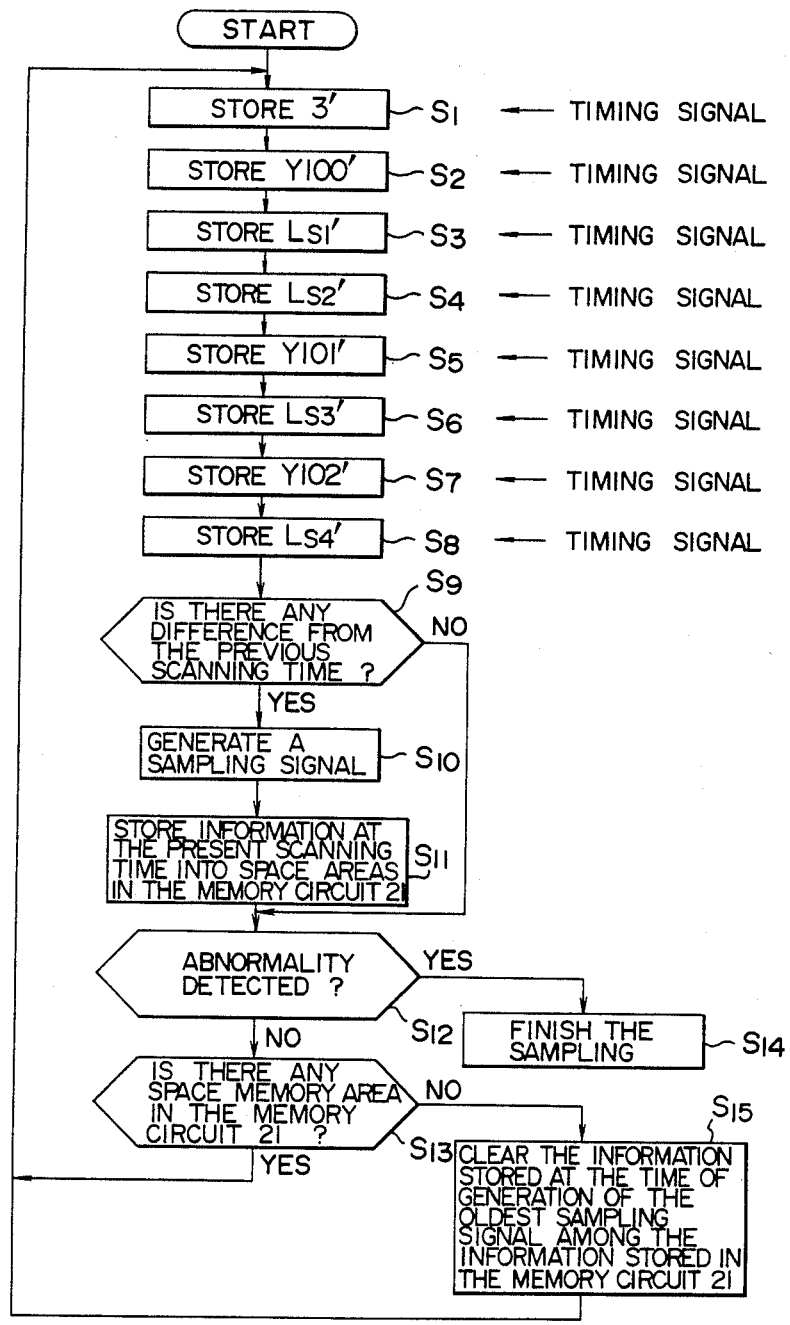
FIG. 4 is a flowchart which is used to explain the operation of the control apparatus shown in FIG. 1.
Figure 5:
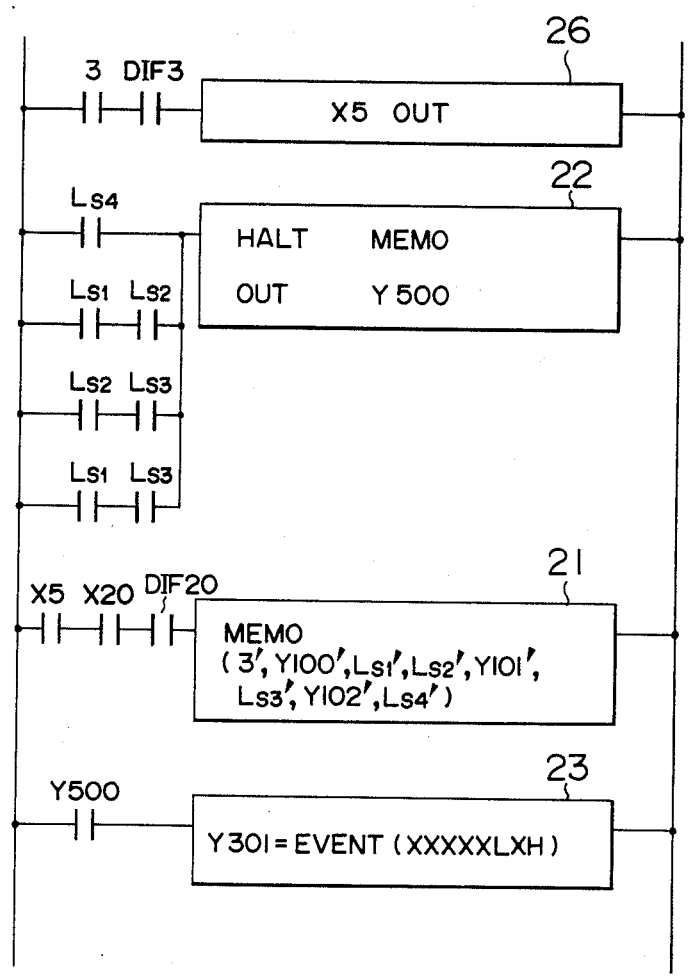
FIG. 5 is a diagram showing an example of a sequence program to set the operating condition of a part of the circuits shown in FIG. 1.

The signal state memory circuit 21 stores the states of a plurality of binary signals handled by the operation circuit 11 each time the sampling signal $20'$ is generated from the generator 20. FIG. 4 shows a flowchart for the writing operation into the signal state memory circuit 21 in this case. FIG. 5 shows an example of a sequence program to set the operating conditions of a write start control circuit 26 to start the writing operation into the signal state memory circuit 21, abnormality detecting circuit 22, signal state memory circuit 21, and setting circuit 23.

When the push button 3 (refer to FIGS. 2 and 5) is pressed, a contact $DIF_3$ is closed. This contact $DIF_3$ is closed only for the period of time when the differential value upon depression of the push button 3 is the positive value. When the contact $DIF_3$ is closed, a signal to close a contact $X_5$ to set the memory circuit 21 into the operation standby mode is outputted. The contact $X_5$ is held in the ON state until the motor 2 stops thereafter.

As shown in steps $S_1$ to $S_8$ in FIG. 4, each time the timing signal is outputted from the generator 13, the signal states of the input signals $3'$ and $L_{s1}'$ to $L_{s4}'$ received by the operation circuit 11 from the input circuit 10 and of the signals $Y100'$ to $Y102'$ outputted from the operation circuit 11 through the output circuit 12 are stored into the input/output memory circuit 25. In step $S_9$, the operation circuit 11 compares each signal stored in the input/output memory circuit 25 at the previous scanning time with each signal stored at the present scanning time, respectively. If it is determined that no change occurs in any of those signals in step $S_9$ from the result of the comparison, the processing routine is directly advanced to step $S_{12}$. If any change is detected, step $S_{10}$ follows. In step $S_{10}$, the sampling signal is generated from the sampling signal generator 20.

A contact $X_{20}$ is closed each time the sampling signal is generated from the generator 20. A contact $DIF_{20}$ is closed only for the period of time when the differential value of the sampling signal 20' is the positive value, so that the signal state memory circuit 21 receives through the operation circuit 11 each signal stored in the input-/output memory circuit 25 at the present scanning time each time the sampling signal 20' is generated as shown in step $S_{11}$ in FIG. 4 and then stores those signals into space areas. In the normal operating mode, as shown in FIG. 3, the respective signals are stored into the memory circuit 21 as if they were changed as shown in FIG. 6.

In step $S_{12}$, a check is made to see if an abnormality signal has been outputted or not from the abnormality detecting circuit 22.

In FIG. 5, the detecting circuit 22 determines that the abnormality occurred when the limit switch $L_{s4}'$ operates, when both of the limit switches $L_{s1}$ and $L_{s2}$ are turned on, when the limit switches $L_{s2}$ and $L_{s3}$ are simultaneously turned on, and when the limit switches $L_{s1}$ and $L_{s3}$ are simultaneously turned on. Thus, as shown in step $S_{14}$, the detecting circuit 22 outputs a signal "HALT MEMO" to finish the sampling and stop the subsequent storing operation of the signal state memory circuit 21 and a signal "OUT Y500" to close a contact $Y_{500}$.

Among a plurality of signals handled by the operation circuit 11, the sole signal or a combination of a plurality of signals which are caused only in the abnormal operating mode is not limited to the case shown in FIG. 5. For example, since it is impossible that both signals Y100 and Y102 are simultaneously turned on, it is sufficient to connect their series circuits in a manner such that the abnormality detecting circuit 22 operates when both outputs are simultaneously turned on.

FIGS. 6 and 8 show the case where the signal state memory circuit 21 stored all signals when the sampling signal was generated. However, in order to reduce the memory capacity of the memory circuit 21, a check is made to see if space memory areas exist in the memory circuit 21 or not as shown in step $S_{13}$. If some space memory areas exist, the processing routine may be directly returned to step $S_1$. If no space memory area exists, step $S_{15}$ may follow.

In step $S_{15}$, the information stored at the time of generation of the oldest sampling signal is cleared from among the information stored in the memory circuit 21.

The setting circuit 23 has a setting device (not shown) to output a ternary signal corresponding to each of the push button 3, limit switches $L_{s1}$ to $L_{s4}$, and signals Y100 to Y102.

Figure 7:
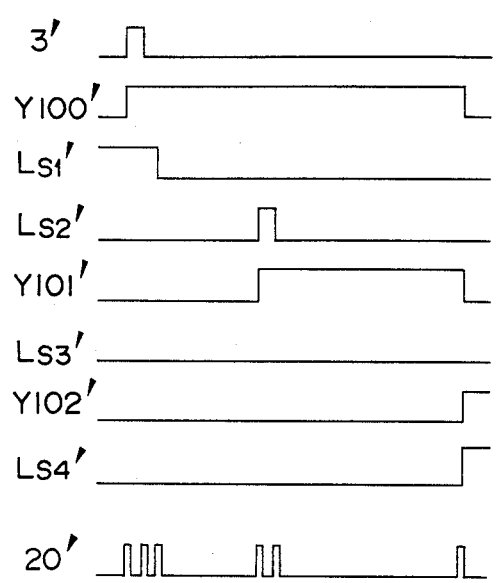
FIG. 7 is a time chart for the input/output signals when the system to be controlled shown in FIG. 2 abnormally operates.

FIG. 7 shows a time chart in the case where since the limit switch $L_{s3}$ did not operate, the handcar 1 came into contact with the limit switch $L_{s4}$, so that the handcar 1 stopped at the position where the limit switch $L_{s4}$ is attached. In this case, the limit switch $L_{s4}$ is closed, so that the abnormality detecting circuit 22 operates and the contact $Y_{500}$ is closed and the setting circuit 23 is made operative.

In this state, the setting circuit 23 is operated to investigate the causes of the occurrence of the abnormality.

By operating the ternary signal setting device of the setting circuit 23, the conditions are set in the signal state memory circuit 21 in a manner such that: the memory content corresponding to the limit switch $L_{s3}$ is stored as H; the memory content corresponding to the limit switch $L_{s4}$ is stored as L; and the memory contents of the other limit switches are stored as X representing that either H or L is good.

The detecting circuit 24 checks the presence and absence of the memory content which satisfies the above condition in the signal state memory circuit 21. In the case where the signals change as shown in FIG. 7, the memory contents stored in the memory circuit 21 are as shown in FIG. 8. Therefore, the detecting circuit 24 detects that the memory content which satisfies the condition exists in the memory area f. In this case, the detecting circuit 24 informs that the above condition is satisfied by way of a voice, light, or the like. Due to this, it is possible to know that the malfunction occurred because the limit switch $L_{s3}$ didn't operate normally.

It will be a rare case that the cause of the malfunction can be found out by merely performing such an operation once. In this case, the setting by the setting circuit 23 is changed and the similar operation may be repeatedly executed.

In the case where all conditions are set to H or L by the setting circuit 23, a binary signal setting device can be used as the condition setting device.

When the number of inputs of the input circuit 10 and the number of outputs of the output circuit 12 are large, it is undesirable to store the signal states with respect to all inputs and outputs. In this case, it is sufficient to store the signal states of only the input and output signals which are considered to be particularly effective to investigate the causes of the occurrence of the abnormality.

Figure 9:
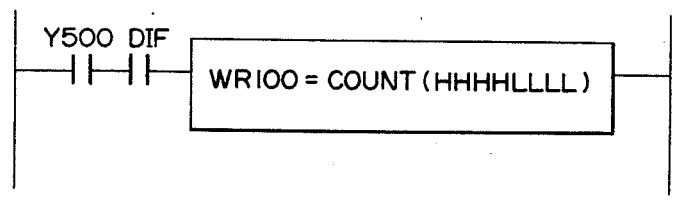
FIGS. 9 and 10 are diagrams showing different condition setting examples by a condition setting circuit.
Figure 10:
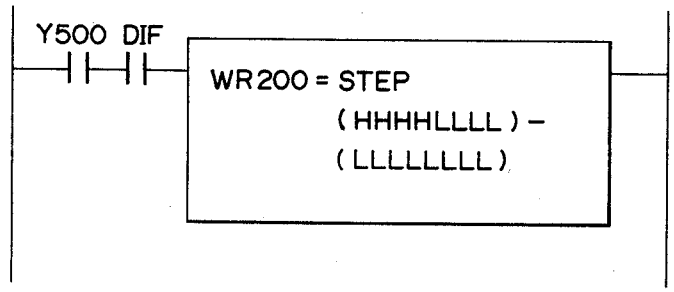

In addition, it is also possible to display the signals which satisfy the conditional contents set by the setting circuit using a CRT or a liquid crystal display. On one hand, as shown in FIG. 9, the use of a COUNT command enables the detecting circuit to detect the number of areas in the signal state memory circuit 21 which satisfy the conditions written in the parenthesis ( ). As shown in FIG. 10, the use of a command to detect the number of steps also enables the detecting circuit to detect the number of steps stored in the signal state memory circuit 21 from the condition written in the parenthesis of the first item to the condition written in the parenthesis of the second item.

We claim:
1. A sequence control apparatus comprising:
program memory means for storing a sequence program;
input means which receives external information necessary for sequence control;
operating means for executing logic operations of a plurality of signals including said external information received from said input means in accordance with an instruction from said sequence program read out from said program memory means;
output means for outputting control signals in accordance with the results of said logic operations by said operating means;
sampling signal generating means;
signal state memory means for storing, at any time within a single scanning period, states of a plurality of binary signals handled by said operating means in synchronism with a sampling signal which is generated from said sampling signal generating means;
signal state combination setting means for setting a special combination of the states of said plurality of binary signals; and detecting means for detecting presence and absence of the combination of the signal states set by said setting means in said signal state memory means.

2. A sequence control apparatus according to claim 1, wherein said signal state memory means comprises a memory for sequentially and periodically updating memory addresses and is controlled by said operating means and said sampling signal generating means such that each time said sampling signal is generated from said sampling signal generating means, the states of the plurality of binary signals are stored synchronously with the latest sampling signal in place of the states of the plurality of binary signals taken in synchronism with the oldest sampling signal from among the states of said plurality of binary signals stored.

3. A sequence control apparatus according to claim 2, wherein said plurality of binary signals handled by said operating means are outputs of said input means.

4. A sequence control apparatus according to claim 2, wherein said plurality of binary signals handled by said operating means are inputs of said output means.

5. A sequence control apparatus according to claim 2, wherein said plurality of binary signals handled by said operating means are outputs of said input means and inputs of said output means.

6. A sequence control apparatus comprising:
program memory means for storing a sequence program;
input means which receives external information necessary for sequence control;
operating means for executing logic operations of a plurality of signals including said external information received from said input means in accordance with an instruction from said sequence program read out from said program memory means;
output means for outputting control signals in accordance with the results of said logic operations by said operating means;
sampling signal generating means;
signal state memory means for storing states of a plurality of binary signals handled by said operating means in synchronism with a sampling signal which is generated from said sampling signal generating means;
signal state combination setting means for setting a special combination of the states of said plurality of binary signals; and
detecting means for detecting presence and absence of the combination of the signal states set by said setting means in said signal state memory means;
Wherein said sampling signal generating means generates the sampling signal when any of said plurality of binary signals handled by said operation means changes.

7. A sequence control apparatus comprising:
program memory means for storing a sequence program;
input means which receives external information necessary for sequence control;
operating means for executing logic operations of a plurality of signals including said external information received from said input means in accordance with an instruction from said sequence program read out from said program memory means;
output means for outputting control signals in accordance with the results of said logic operations by said operating means;
sampling signal generating means;
abnormality detecting means for detecting the occurrence of one of a sole signal state and a combination of a plurality of signal states which are cuased only in an abnormal operating mode from among a plurality of binary signals handled by said operating means;
signal state memory means for storing, at any time within a single scanning period, the states of said plurality of binary signals handled by said operating means in synchronism with a sampling signal which is generated from said sampling signal generating means and for holding said states of said plurality of binary signals handled by said operating means after said abnormality detecting means detects the abnormality;
signal state combination setting means for setting a special combination of said plurality of binary signal states; and
detecting means for detecting whether or not said combination of said binary signal states set by said setting means has been stored in said signal state memory means.

8. A sequence control apparatus comprising:
program memory means for storing a sequence program;
input means which receives a plurality of external information necessary for sequence control;
operating means for executing logic operations of a plurality of binary signals including said plurality of external information received from said input means scanning in accordance with an instruction from said sequence program read out from said program memory means;
output means for outputting control signals in accordance with the results of said logic operations by said operating means;
signal state memory means for storing, at any time within a single scanning period, the states of said plurality of binary signals handled by said operating means;
signal state combination setting means for optionally setting a special combination of said plurality of binary signal states; and
detecting means for detecting whether or not said combination of said signal states set by said setting means has been stored in said signal state memory means.

9. A sequence control apparatus according to claim 8, wherein said signal state memory means comprises a memory for sequentially and periodically updating memory addresses and is controlled by said operating means and a sampling signal generating means such that each time a sampling signal is generated from said sampling signal generating means, the states of the plurality of binary signals are stored synchronously with the latest sampling signal in place of the states of the plurality of binary signals taken in synchronism with the oldest sampling signal from among the states of said plurality of binary signals stored.

* * * * *